Patented Feb. 14, 1950

2,497,449

UNITED STATES PATENT OFFICE 2,497,449

RESIN-GLYCERIDE COATING

Samuel S. Gutkin, Plainfield, N. J., assignor to Falk & Company, Carnegie, Pa., a corporation of Pennsylvania No Drawing. Application May 2, 1946,
Serial No. 666,810

12 Claims. (Cl. 260—104)

This invention relates to a method of making a resin varnish composed primarily of fatty acid ester, polyhydric alcohol, and thermoplastic acid natural resin.

An object of the invention is to produce a clear, soluble varnish capable of forming a smooth continuous film.

Another object of my invention is to produce a resin varnish of the above indicated sort with the use of a minimized content of polyhydric alcohol.

It is a still further object of my invention to produce in the preferred exemplification of my method a resin capable of forming a film which is hard, as well as smooth and continuous.

The method of my invention is simple in procedure and in the components employed. Primarily it consists in reacting a natural acid resin with one or more of the polyhydric alcohols, such as pentaerythritol and its substantially equivalent polyhydric alcohols having more than two primary valences as for example sorbitol, mannitol, tri-methylol-methyl methane and polymers of the polyhydric alcohols in the presence of fatty acid glyceride and a saponifying agent. The above expression "polyhydric alcohols having more than two primary valences" serves to distinguish polyhydric alcohols of the included sort from dihydric alcohols and from a glycerol having two primary valences and one secondary valence.

In the procedure of my method, the acid resin and the fatty acid ester in the form of a drying oil or semi-drying oil can be included with relatively wide variation in their proportions. The polyhydric alcohol, as the esterifying reagent, also may be included in a relatively wide range of proportions with respect to the acid resin, it being desirable, however, to include it in a proportion sufficient to give the composite product compatibility with basic pigments. With respect to the order of saponification it is to be noted that saponification in any substantial order tends to render a film of the product varnish tough and glossy.

Excluding of course compounds of sodium, potassium and the like which give water-soluble soap, a saponifying agent may be composed of any basic reacting metal oxides and hydroxides. In the specific examples which follow calcium oxide and zinc oxide are used to exemplify this large and well known class of saponifying agents. It may be noted that the saponification of the acid resin can be performed in advance, as in the normal 5% to 5.5% limed rosin, can be performed during the progress of the main reaction, or can be performed partly in one stage and partly in the other. It is, however, essential that the esterification of the acid resin be performed in the presence of the fatty acid glyceride and that the acid resin either be saponified in advance, that the saponifying agent be included in the reaction vessel simultaneously with the other ingredients, or that saponification be effected by a combination of those procedures.

The following will exemplify the method of my invention and illustrate the principles involved in its practice. They vary from examples illustrating the best commercial practice to those illustrating the necessity of following certain operating procedure.

In all of the following specific examples pentaerythritol is used as the polyhydric alcohol of the formulation, but it is to be understood that without change in procedure other polyhydric alcohols such as sorbitol, mannitol, polymers of polyhydric alcohols which have more than two primary valences and mixtures of such alcohols may be used to replace all or part of the pentaerythritol in the formulations of the examples without more than incidental change in the properties of the resulting products.

Example 1

This exemplifies preferred commercial practice under my invention. In accordance with this exemplification, I use the following formulation:

| | Parts by weight |
|---|---|
| Limed rosin (5.5%) | 1000 |
| Oiticica oil | 1500 |
| Pentaerythritol | 120 |

These ingredients were placed together in a commercial kettle and heated quickly to a temperature of about 560° F. The batch was held at about that temperature for approximately two and one-half hours, was then cooled for thinning, and was thinned to 60% solids with mineral spirits. This solution and a film deposited from it had the following properties:

| | |
|---|---|
| Viscosity (Gardner-Holdt) | Z–4 |
| Color (Hellige) | 7 |
| Acid No | 7 |
| Set (in air) | 4 hours |
| Dry (in air) | 8 hours |
| Hardness | Tough |
| Adhesion | Good |
| Gloss | High |
| Flow | Good |

It will be noted that this exemplification is an excellent coating material, being tough, adhesive and quick-drying.

Example 2

This example also illustrates preferred commercial practice. In it the formulation is:

| | Parts by weight |
|---|---|
| Dehydrated castor oil | 1500 |
| Limed rosin (5.5%) | 1000 |
| Pentaerythritol | 120 |

These ingredients were charged simultaneously into a commercial kettle, the batch was brought quickly to a temperature of 525° F. and was held at that temperature for about five and one-half hours. It then was cooled for thinning and was thinned to 60% solids with mineral spirits. It may be noted that the dehydrated castor oil of this example was heavy bodied. This solution and a film deposited from it has the following properties:

| | |
|---|---|
| Viscosity (Gardner-Holdt) | Z |
| Acid No. | 7.5 |
| Set (in air) | 5 hours |
| Dry (in air) | 9 hours |
| Hardness | Tough |
| Adhesion | Good |
| Color (Hellige) | 5 |
| Gloss | High |
| Flow | Good |

It will be noted that the product of this example also is a particularly high quality coating material.

Example 3

This is a preferred commercial example of my method, in which I use a fatty acid glyceride having film-forming properties inferior to those of otiticica oil and dehydrated castor oil. Accommodation to that fact is made, and the product while it does not come up to the unusually high properties of the products obtained in Examples 1 and 2, is a highly acceptable coating material. In this exemplification, the formulation was:

| | Parts by weight |
|---|---|
| Limed rosin (5.5%) | 300 |
| Linseed oil | 600 |
| Pentaerythritol | 108 |
| Calcium oxide | 8 |

All the ingredients were introduced simultaneously into a commercial kettle and were brought quickly to about 500° F. The batch was held close to that temperature for about 6 hours, was cooled and was thinned to 60% solids with mineral spirits. The solution and a film deposited from it showed the following properties:

| | |
|---|---|
| Viscosity (Gardner-Holdt) | A to B |
| Acid No. | 12 |
| Set (in air) | 15 hours |
| Dry (in air) | 24 hours |
| Hardness | Fairly tough |
| Adhesion | Fair |
| Color (Hellige) | 6 to 7 |
| Gloss | High |
| Flow | Fair |

It will be noted that in this example the deficiency of the linseed oil in drying properties, as compared with the oiticica oil and the dehydrated castor oil, is in measure compensated by an increased proportion of pentaerythritol and by the use of additional saponifying, namely the calcium oxide.

With the understanding that the effects of the polyhydric alcohol and saponifying agent are in measure complementary and supplementary, it is in some formulations useful to include as much as or more than 10 parts by weight of calcium oxide to each 75 parts by weight of natural acid resin and to include as much as 6 parts by weight of zinc oxide to each 75 parts by weight of the resin. In general, it is possible to include as much saponifying agent as will react in any given formulation. I can say that as little as 1.5 parts by weight of calcium oxide and 1 part by weight of zinc oxide to 75 parts by weight of natural acid resin favorably affect the toughness of the film. As stated above, it is immaterial whether the saponifying agent be reacted with the resin before or while the acid resin is reacted with the polyhydric alcohol. It is, however, important that the polyhydric alcohol be given opportunity to combine partially with the resin which has been partially saponified or is undergoing partial saponification.

Exemplification of these factors now will be given.

Example 4

This example illustrates the approximate maximum useful inclusion of saponifying agent for the given quantities of primary ingredients. The formulation in this example was:

| | Parts by weight |
|---|---|
| K-wood rosin | 75 |
| Pentaerythritol | 45 |
| Linseed oil | 150 |
| Calcium oxide | 10 |

All the constituents were charged simultaneously into a commercial kettle and the batch was brought to a temperature of 500° F. in 45 minutes, under a steady stream of carbon dioxide to stir and purge the materials. The batch then was cooled for thinning, and was thinned to 60% solids with mineral spirits. The properties of the solution and of a film deposited from it were as follows:

| | |
|---|---|
| Viscosity (Gardner-Holdt) | Z-6+ |
| Acid No. | 7.4 |
| Color (Hellige) | 8 to 9 |
| Set (in air) | 2 hours |
| Dry (in air) | 12 hours |
| Hardness | Soft-slightly tough |
| Adhesion | Fair |
| Gloss | Good |
| Flow | Good |

Example 5

In this example the conditions were identical with those of Example 4, and the materials were identical except that 6 parts by weight of zinc oxide were used instead of 10 parts by weight of calcium oxide, the formulation thus being:

| | Parts by weight |
|---|---|
| K-wood rosin | 75 |
| Pentaerythritol | 45 |
| Linseed oil | 150 |
| Zinc oxide | 6 |

The properties of a solution made by thinning to 60% solids with mineral spirits and of a film deposited from it were as follows:

| | |
|---|---|
| Viscosity (Gardner-Holdt) | A |
| Acid No. | 10.5 |
| Set (in air) | 11 hours |
| Dry (in air) | 24 hours |
| Hardness | Tough |
| Adhesion | Good |
| Color (Hellige) | 6 to 7 |
| Gloss | Good |
| Flow | Good |

It should be understood that in all the examples so far the product was clear and homogeneous, and if recovered without thinning is a clear amber colored solid. It also may be noted that purging with carbon dioxide is optional procedure, which insures relatively light color and insures against segregation in the batch.

Example 6

This example was performed to illustrate the importance of the procedure followed in the preceding examples, in which the pentaerythritol, fatty acid glyceride, and thermoplastic acid resin are reacted together simultaneously, with saponification. In this example the formulation was:

| | Parts by weight |
|---|---|
| K-wood rosin | 300 |
| Pentaerythritol | 108 |
| Linseed oil | 600 |
| Calcium oxide | 8 |

The linseed oil and the pentaerythritol were charged together into a commercial kettle and heated to 480° F. This was held for one hour during which the pentaerythritol partially combined with the oil. The calcium oxide and the rosin then were added in that order, with a slight interval between the additions, and the temperature was raised to about 540° F. and was held at that temperature for about two and one-half hours. The product was not homogeneous, but on the contrary there was an insoluble solid floating in the batch. On straining the residue away from that solid and thinning it to 60% solids with mineral spirits a solution of low viscosity was obtained. It did not flow evenly and showed poor drying properties, being still sticky and with poor adhesion after 48 hours.

Example 7

This exemplifies the result if the identical materials and proportions of Example 6 be used, but if procedure analogous to that followed in Examples 1 to 5 inclusive be employed.

In this example the several constituents of the batch used in Example 6 were charged simultaneously into a commercial kettle, the temperature was brought to 540° F. and the batch held at that temperature for 4 hours. The batch was cooled for thinning and was thinned to 60% solids with mineral spirits. The properties of the solution and a film deposited from it were:

| | |
|---|---|
| Viscosity (Gardner-Holdt) | Z-6+ |
| Acid No | 12 |
| Set | 4 hours |
| Dry | 9 hours |
| Hardness | Tough |
| Adhesion | Good |
| Gloss | High |
| Flow | Good |
| Color (Hellige) | 7 |

By exploration of the subject matter, I have found that the order of saponification may be used to regulate the hardness of the film formed from the product resin, without varying the proportions of the other constituents. Within the limits of reactivity a lower order of saponification gives a softer film and a higher order of saponification gives a tougher film. In order to give compatibility with basic pigments, the pentaerythritol should be included in a proportion of at least 1 part by weight to each 30 parts by weight of the combined thermoplastic acid resin and fatty acid glyceride. The effects of the saponification and esterification are complementary and supplementary and may be balanced. It has been noted that toughness and adhesion follow proportionally with proportional saponification. In general I prefer to use a lower proportion of pentaerythritol with oils of higher drying properties, such as a ratio of pentaerythritol to oil and resin about 1 to 20 parts by weight with the oiticica oil and dehydrated castor oil of Examples 1 and 2; and a higher proportion of pentaerythritol in using oils of lower drying properties, such as the 1 to 8 ratio of Example 3 or the 1 to 4.5 ratio of Example 4.

The following comparative example will give, within relatively narrow limits an illustration of the complementary effect of the pentaerythritol and the saponifying reagent. In performing all the parts going to make up this example, the procedure was identical with that followed in Example 3.

Example 8

| | Parts by Weight | | | |
|---|---|---|---|---|
| | 1 | 2 | 3 | 4 |
| K-wood rosin | 75 | 75 | 75 | 75 |
| Pentaerythritol | 34 | 34 | 34 | 45 |
| Linseed oil | 150 | 150 | 150 | 150 |
| Calcium oxide | 2 | 6 | 10 | 2 |

PROPERTIES OF SOLUTIONS AND FILMS

| | | | | |
|---|---|---|---|---|
| Viscosity (Gardner-Holdt) | A | A to B | D | A−. |
| Acid No | 9.4 | 7.3 | 6.1 | 8.2. |
| Set (in air) | 9 hrs | 6 hrs | 6.5 hrs | 9 hrs. |
| Dry (in air) | 24 hrs | 24 hrs | 11 hrs | 24 hrs. |
| Hardness | Soft | Soft [1] | Tough | Soft.[1] |
| Adhesion | Poor | Fair | Good | Fair. |
| Color (Hellige) | 6 to 7 | 8 to 9 | 8 to 9 | 5 to 6. |
| Gloss | High | High | High | High. |
| Flow | Good | Good | Good | Fair. |

[1] But tougher than Part 1.

In making up the solution for film deposition the initial product, as in preceding examples, was diluted to 60% solids with mineral spirits. By an inspection of the several formulations given above it will be seen that the quantities of rosin and of linseed oil remain constant throughout the several parts of the example. The comparison of Example 8 thus is between different aggregate quantities and different proportions of pentaerythritol and saponifying agent. Thus the formulation of Part 3 can be considered to be almost perfectly balanced to give a hard, tough film having a conjunction of what commonly are considered to be desirable characteristics. In Part 4 a minimized quantity of saponifying agent is included in the composition, but this decrease in the content of saponifying agent is in part counterbalanced by including an increased content of pentaerythritol. In Part 2 the proportion of saponifying agent is lower than in Part 3 and there is no compensating increase in the proportion of pentaerythritol; and the film is therefore softer than in Part 3. In Part 1 the proportion of saponifying agent is reduced to the same value as in Part 4, but no compensating increase in the quantity of pentaerythritol is made. The film deposited from a solution of Part 1 thus is softer than the films of the several other parts of Example 8. It is to be understood, however, that all the products including the products of Parts 1 and 4 are good varnishes, which are desirably usable for coating purposes.

Although the proportion of 2 parts by weight of calcium oxide given in Part 1 is relatively low in comparison with the inclusion of rosin, a film of the product varnish has properties which are improved greatly over an otherwise identical formulation in which the effect of saponification is not obtained.

The following example illustrates the wide range in the relative quantities of rosin and oil which may be used. Linseed oil is included in this example to exemplify drying and semi-drying oils in general; and although the use of oils having drying properties in higher or lower order will affect the properties of a film deposited from the product resin, the drying properties of the oil have no substantial relation to the ratio of rosin to oil which is used. The procedure employed in comparative Example 9 is the same as that employed in Example 3, except that the batch was cooked for 3 hours instead of for 6 hours as in Example 3.

Example 9

In this example the formulations were as follows:

|  | Parts by Weight | | | |
| --- | --- | --- | --- | --- |
|  | 1 | 2 | 3 | 4 |
| K-wood rosin | 50 | 100 | 125 | 150 |
| Linseed Oil | 175 | 125 | 100 | 75 |
| Pentaerythritol | 50 | 50 | 50 | 50 |
| Calcium oxide | 10 | 10 | 10 | 10 |

PROPERTIES OF SOLUTIONS AND FILMS

|  | | | | |
| --- | --- | --- | --- | --- |
| Viscosity (Gardner-Holdt) | O | O | Q | Z-3. |
| Color (Hellige) | 9 | 9 | 8 | 9. |
| Acid No | 6.6 | 10.1 | 12.7 | 16.1. |
| Set (In air) | 8 hrs | 2 hrs | 2 hrs | 1 hr. |
| Dry (In air) | 24 hrs | 12 hrs | 12 hrs | 2 hrs. |
| Hardness | Soft | Firm | Hard[1] | Hard.[1] |
| Adhesion | Good | Good | Fair | Fair. |
| Gloss | Fair | do | Good | Good. |
| Flow | Good | do | Fair | Fair. |

[1] Some brittleness but sufficiently elastic.

It is to be understood that as in all the preceding examples, the film was formed from a solution in which the initial product was cut back to 60% solids with mineral spirits. The time of cooking is a well understood variable which has a bearing on the properties of a varnish film. Thus duplicating all the parts of this example but cooking the batch for 6 hours as in Example 3, the hardness of the film deposited from the solution of Parts 1 and 2 was increased, and the tendency toward brittleness of the film deposited from Parts 3 and 4 correspondingly was increased. It will be understood that in using an oil of higher drying properties, such as dehydrated castor oil, the film hardness of Parts 1 and 2 is increased, but as to Parts 3 and 4 the higher drying properties of the oil do not lead to objectionable brittleness. Using an oil of lower drying properties, such as soya bean oil, the films are softer throughout.

Example 10

In order to exemplify the use of a semi-drying oil, the runs of Example 9 were duplicated using soya bean oil to replace the linseed oil of that example. In this example the formulation and procedure was as follows:

|  | Parts by weight | | | |
| --- | --- | --- | --- | --- |
|  | 1 | 2 | 3 | 4 |
| K-wood rosin | 50 | 100 | 125 | 150 |
| Soya bean oil | 175 | 125 | 100 | 75 |
| Pentaerythritol | 50 | 50 | 50 | 50 |
| Calcium oxide | 10 | 10 | 10 | 10 |

PROPERTIES OF SOLUTIONS AND FILMS

|  | | | | |
| --- | --- | --- | --- | --- |
| Viscosity | L | L | M | Z-1. |
| Color (Hellige) | 8 | 8 | 7 | 8. |
| Acid No | 7.1 | 11 | 13.2 | 13.3. |
| Set | 8 hrs | 2 hrs | 2 hrs | 1 hr. |
| Dry | 30 hrs | 14 hrs | 14 hrs | 4 hrs. |
| Hardness | Soft | Firm | Hard | Hard. |
| Adhesion | Good | Good | Good | Good. |
| Gloss | Fair | Fair | do | Do. |
| Flow | Good | Good | do | Do. |

In all parts of this example the batch was cooked for 6 hours, being thus carried further than in Example 9 in which linseed oil was used. In each instance the product was thinned to 60% solids with mineral spirits and a film was deposited from that solution.

On the understanding that the products of all the foregoing exemplifications, except Examples 6, are satisfactory coating materials differing from each other in degree and not in kind, it will be clear that great latitude in the proportioning of the several ingredients is permissible. Such limits as are effective are inherent and follow well-known principles, as for example the avoidance of a quantity of saponifying agent so high as to be incompletely reacted, and the inclusion of pentaerythritol in sufficient quantity to give compatibility with basic pigments. The limitation on temperature of cooking is simply determined in accordance with well-known principles on the basis of of the pentaerythritol. Thus the temperature must be about as high as 260° C. in order that the pentaerythritol may react, and must not be substantially higher than 450° C. in order that the pentaerythritol will not suffer decomposition. The critical factor is that the saponifying agent be present when the pentaerythritol and the drying oil were cooked together. That requirement being met, the proportions of the several ingredients may be varied even more than is indicated in the foregoing examples, various proportional formulations being employed to give specific desired results in correlation with the time and temperature of the cooking and other variable factors.

Examples of the varnish may be made differing from the previous examples and from themselves in the order of certain of their characteristics, but not fundamentally, by adding the fatty acid glyceride partially as an extension of the varnish rather than including all of it in the initial reaction. The following examples illustrate the procedure followed in increasing the oil length of the varnish after the initial reaction has taken place.

Example 11

In this example all of the ingredients except part of the fatty acid glyceride were introduced into a treating vessel simultaneously. These ingredients were:

| | Parts by weight |
|---|---|
| K-wood rosin | 150 |
| Linseed oil | 75 |
| Pentaerythritol | 50 |
| Calcium oxide | 10 |

The ingredients were brought to a temperature of 500° F. and held at that temperature for two hours. The addition of 75 parts by weight of linseed oil was then made, and heating at a temperature of 500° F. was continued for one hour.

The properties of a solution made by thinning to 60% solids with mineral spirits were as follows:

| | |
|---|---|
| Viscosity (Gardner-Holdt) | A |
| Color (Hellige) | 8 |
| Acid No | 20.1 |
| Set | 35 minutes |
| Dry | 36 hours |
| Hardness | Slightly tacky |
| Adhesion | Good |
| Gloss | High |
| Flow | Good |

Although it is possible to extend the oil length, some fatty acid glyceride being initially present, it is not possible to make a soluble thermoplastic varnish without the presence of the fatty acid glyceride in the initial batch. This is exemplified by the following:

*Example 12*

In this example the formulation was:

| | Parts by weight |
|---|---|
| K-wood rosin | 150 |
| Pentaerythritol | 150 |
| Calcium oxide | 10 |

All of the ingredients were introduced together into a treating vessel and heated to a temperature of 500° F. The batch was held at 500° F. for three hours. The product was a dark red exceedingly viscous material which was almost solid. This material is insoluble in mineral spirits and is to be considered in practical effect infusible. Although not a varnish, it is a useful product which will be made the subject matter of a separate application.

It has been noted that any of the drying or semi-drying oils may be used satisfactorily in the process, with only such variation in the properties of the product as is consistent with the specific properties of the oils themselves. In the preceding examples rosin has been given generally to exemplify the natural acid thermoplastic resins. The other resins belonging to that class may however all of them be used in part or entirely to replace the rosin with results which differ only within limits and in accordance with the several characteristic differences between those resins. Thus Run Congo, kauri, mastic, East India, Manila and the numerous other natural gums may be used as a resin in, or as the resin content of, the batch. The primary distinction between all the natural acid resins is in the locality of their production, rather than in their constitution.

Run Congo gum may be used to exemplify the inclusion of natural resins other than rosins as in the following examples.

*Example 13*

In this example the formulation was as follows:

| | Parts by weight |
|---|---|
| Run Congo gum | 150 |
| Linseed oil | 75 |
| Pentaerythritol | 50 |
| Calcium oxide | 10 |

All of these ingredients were heated together in a treating vessel to a temperature of 500° F. and were held at that temperature for three hours.

The product was thinned to 50% solids with mineral spirits and the properties of the solution and the film deposited from it were as follows:

| | |
|---|---|
| Viscosity (Gardner-Holdt) | Z-6+ |
| Color (Hellige) | 9 |
| Acid No | 22 |
| Set | 20 minutes |
| Dry | 4 hours |
| Hardness | Slightly tacky |
| Adhesion | Good |
| Gloss | High |
| Flow | Good |

*Example 14*

In accordance with this experiment the formulation was:

| | Parts by weight |
|---|---|
| Run Congo gum | 75 |
| Linseed oil | 150 |
| Pentaerythritol | 45 |
| Calcium oxide | 10 |

The ingredients were all heated together in a heating vessel to a temperature of 500° F. and were held at that temperature for three hours.

The properties of a solution made by thinning to 40% solids with mineral spirits were as follows:

| | |
|---|---|
| Viscosity (Gardner-Holdt) | Z-3 |
| Color (Hellige) | 9 |
| Acid No | 13.5 |
| Set | 35 minutes |
| Dry | 2 hours |
| Hardness | Tough |
| Adhesion | Good |
| Gloss | Fair |
| Flow | Good |

It is to be understood that the product of all the examples except Examples 6 and 12, which are introduced for purposes of comparison are good usable varnishes having each properties which render it desirable for use under certain conditions. These desirable products are all very soluble in mineral spirits, and have a low precipitation temperature when included in any proportion in the solution. The good film forming properties of the product varnish as made from a natural acid resin and pentaerythritol and a drying or semi-drying oil are attributed to the saponification at an appropriate stage of the process. The compatibility of the product is attributable to the procedure noted above in which the esterification of the acid resin is performed in the presence of the fatty acid glyceride and in the presence of the saponifying agent which latter may be either free or previously reacted with the resin.

In every example the pentaerythritol was of the technical grade consisting of 85% of unpolymerized pentaerythritol. The oils were all refined, the linseed oil being what is known as varnish makers' linseed and the soya bean oil being similarly purified. Where the linseed oil is described as kettle bodied it was held at a temperature of 545° F. until a viscosity of Z-5 (Gardner-Holdt) was obtained. The soya bean oil was similarly bodied to a Z-1 viscosity. In each example the mineral spirits with which the product was thinned was a refined petroleum cut distilling within the temperature range of 300° F. to 400° F. and known commercially as V. M. P. naphtha. As explained above, the saponifying agent may be any metal oxide or hydroxide capable of forming with the natural acid resin a water insoluble soap. This class is too broad to exemplify in detail herein. As specific notation of saponifying agents usable in the process, I may give in further exemplification of the broad class and as preferred saponifying agents cadmium oxide, titanium oxide, aluminum hydroxide, stannic hydroxide, beryllium oxide and hydroxide from amongst the great number of saponifying agents which suitably may be used. Although not so stated in every example, carbon dioxide was in each instance run through the batch during cooking, in well known manner to stir and purge the batch. As usual in varnish manufacture, the use of carbon dioxide in this manner tend to give a varnish of lighter color.

Taking Example 3 as typical, substitution of an equal weight of mannitol and sorbitol respectively for pentaerythritol in the formulation of that example showed but slight differences in the properties of the product varnish from those posessed by the product of Example 3. A similar result is obtained by replacing one-half the weight of pentaerythritol with an equal weight of sorbitol and mannitol respectively. In using polyhydric alcohols other than pentaerythritol having more than two primary valences as substantial equivalents for pentaerythritol, some adjustment to the relative reactivity of the specific polyhydric alcohol with respect to the reactivity of pentaerythritol may be made, if so desired, in order that the products of the specific formulations will correspond closely in the details of their properties.

I claim as my invention:

1. The method of making a resin-glyceride coating composition by reacting together acid thermoplastic natural resin, fatty acid glyceride and pentaerythritol in the presence of a basic-reacting saponifying agent capable of forming water-insoluble soaps, at a temperature between the lowest reaction temperature of the pentaerythritol and the decomposition temperature of that reagent, the pentaerythritol and the said resin being reacted with the fatty acid glyceride simultaneously.

2. The method of making a resin-glyceride coating composition by simultaneously reacting together acid thermoplastic natural resin partially saponified by means of a basic-reacting saponifying agent capable of forming water-insoluble soaps, pentaerythritol and fatty acid glyceride at a temperature between the lowest reaction temperature of the pentaerythritol and the decomposition temperature of that reagent.

3. The method of making a resin-glyceride coating composition by reacting together acid thermoplastic natural resin, fatty acid glyceride possessing conjugate unsaturation and pentaerythritol in the presence of a basic-reacting saponifying agent capable of forming water-insoluble soaps, at a temperature between the lowest reaction temperature of the pentaerythritol and the decomposition temperature of that reagent, the pentaerythritol and the said resin being reacted with the said conjugate fatty acid glyceride simultaneously.

4. The method of making a resin-glyceride coating composition by simultaneously reacting together acid thermoplastic natural resin partially saponified by means of a basic-reacting saponifying agent capable of forming water-insoluble soaps, pentaerythritol and a fatty acid glyceride possessing conjugate unsaturation at a temperature between the lowest reaction temperature of the pentaerythritol and the decomposition temperature of that reagent.

5. The method of making a resin-glyceride coating composition by simultaneously reacting together limed rosin, pentaerythritol and fatty acid glyceride at a temperature between the lowest reaction temperature of the pentaerythritol and the decomposition temperature of that reagent.

6. The method of making a resin-glyceride coating composition by simultaneously reacting together limed rosin, pentaerythritol and fatty acid glyceride possessing conjugate unsaturation at a temperature between the lowest reaction temperature of the pentaerythritol and the decomposition temperature of that reagent.

7. The method of making a resin-glyceride coating composition by reacting together acid thermoplastic resin, fatty acid glyceride, and a polyhydric alcohol having more than two primary valences in the presence of a basic-reacting saponifying agent capable of forming water-insoluble soaps, at a temperature between the lowest reaction temperature of the polyhydric alcohol and the decomposition temperature of that reagent, the said polyhydric alcohol and the said resin being reacted with the fatty acid glyceride simultaneously.

8. The method of making a resin-glyceride coating composition by simultaneously reacting together acid thermoplastic natural resin partially saponified by means of a basic-reacting saponifying agent capable of forming water insoluble soaps, a polyhydric alcohol having more than two primary valences, and fatty acid glyceride at a temperature between the lowest reaction temperature of the said ployhydric alcohol and the decomposition temperature of that reagent.

9. The method of making a resin-glyceride coating composition by reacting together acid thermoplastic natural resin, fatty acid glyceride possessing conjugate unsaturation and a polyhydric alcohol having more than two primary valences in the presence of a basic-reacting saponifying agent capable of forming water-insoluble soaps, at a temperature between the lowest reaction temperature of the said polyhydric alcohol and the decomposition temperature of that reagent, the said polyhydric alcohol and the said resin being reacted with the said conjugate fatty acid glyceride simultaneously.

10. The method of making a resin-glyceride coating composition by simultaneously reacting together acid thermoplastic natural resin partially saponified by means of a basic-reacting saponifying agent capable of forming water-insoluble soaps, a polyhydric alcohol having more than two primary valences and a fatty acid glyceride possessing conjugate unsaturation at a temperature between the lowest reaction temperature of the said polyhydric alcohol and the decomposition temperature of the reagent.

11. The method of making a resin-glyceride coating composition by simultaneously reacting together limed rosin, a polyhydric alcohol having more than two primary valences and fatty acid glyceride at a temperature between the lowest reaction temperature of the said polyhydric alcohol and the decomposition temperature of that reaction.

12. The method of making a resin-glyceride coating composition by simultaneously reacting together limed rosin, a polyhydric alcohol having more than two primary valences and fatty acid glyceride possessing conjugate unsaturation at a temperature between the lowest reaction temperature of the said polyhydric alcohol and the decomposition temperature of that reagent.

SAMUEL S. GUTKIN.

REFERENCES CITED

The following references are of record in the file of this patent:

UNITED STATES PATENTS

| Number | Name | Date |
|---|---|---|
| 2,345,358 | Rheineck | Mar. 28, 1944 |
| 2,470,964 | Witcoff | May 24, 1949 |

FOREIGN PATENTS

| Number | Country | Date |
|---|---|---|
| 351,945 | Great Britain | June 16, 1931 |